US010542043B2

(12) United States Patent
Ziemann et al.

(10) Patent No.: US 10,542,043 B2
(45) Date of Patent: Jan. 21, 2020

(54) SYSTEM AND METHOD FOR ENHANCING TRUST FOR PERSON-RELATED DATA SOURCES

(71) Applicant: salesforce.com, inc., San Francisco, CA (US)

(72) Inventors: Tyler Ziemann, San Francisco, CA (US); Harish Peri, San Francisco, CA (US); Atul Singh, Fremont, CA (US)

(73) Assignee: salesforce.com.inc., San Francisco, CA (US)

( * ) Notice: Subject to any disclaimer, the term of this patent is extended or adjusted under 35 U.S.C. 154(b) by 733 days.

(21) Appl. No.: 13/791,295

(22) Filed: Mar. 8, 2013

(65) Prior Publication Data

US 2013/0239170 A1 Sep. 12, 2013

Related U.S. Application Data

(60) Provisional application No. 61/608,423, filed on Mar. 8, 2012.

(51) Int. Cl.
*H04L 29/06* (2006.01)
(52) U.S. Cl.
CPC .................. *H04L 63/20* (2013.01)
(58) Field of Classification Search
CPC ....................................................... H04L 63/20
USPC ............................ 705/2, 3; 713/201; 726/30
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,855,020 A * | 12/1998 | Kirsch | G06F 17/30864 |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |

(Continued)

OTHER PUBLICATIONS

U.S. Appl. No. 14/145,735, Non Final Office Action dated May 15, 2015, 15 pages.

(Continued)

*Primary Examiner* — John A Pauls
(74) *Attorney, Agent, or Firm* — Morris & Kamlay LLP (57) ABSTRACT

The technology disclosed relates to enhancing trust for person-related data sources by tracking person-related sources using trust objects that hold trust metadata. In particular, it relates to generating trust-enhanced data by appending trust metadata to social media content and other business-to-business entities, and further using the trust-enhanced data to develop social engagement models based on customer preferences. The trust metadata described includes names, interface categories and origins of the person-related data sources along with customer engagement preferences and connection types.

1 Claim, 6 Drawing Sheets

Trust-Enhanced Social Environment

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,697,824 B1 | 2/2004 | Bowman-Amuah |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,423,535 B2 | 4/2013 | Weissman et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 9,626,523 B2 | 4/2017 | Isaacs et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0126469 A1* | 7/2003 | King .................. H04L 63/10 726/1 |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0220103 A1 | 9/2007 | Rogers et al. |
| 2007/0261116 A1 | 11/2007 | Prafullchandra et al. |
| 2008/0103879 A1 | 5/2008 | Armstrong |
| 2008/0162496 A1 | 7/2008 | Postrel |
| 2008/0249972 A1 | 10/2008 | Dillon |
| 2009/0063415 A1 | 3/2009 | Chatfield et al. |
| 2009/0063619 A1 | 3/2009 | Chijiiwa |
| 2009/0100342 A1 | 4/2009 | Jakobson |
| 2009/0132395 A1 | 5/2009 | Lam et al. |
| 2009/0177744 A1 | 7/2009 | Marlow et al. |
| 2010/0088313 A1 | 4/2010 | Hoffman et al. |
| 2010/0306185 A1* | 12/2010 | Smith .................. G06Q 10/107 707/709 |
| 2011/0113022 A1 | 5/2011 | Polychronidis |
| 2011/0218958 A1 | 9/2011 | Warshavsky et al. |
| 2011/0247051 A1 | 10/2011 | Bulumulla et al. |
| 2012/0041939 A1 | 2/2012 | Amsterdamski |
| 2012/0042218 A1 | 2/2012 | Cinarkaya et al. |
| 2012/0233103 A1 | 9/2012 | Ashrafi |
| 2012/0233137 A1 | 9/2012 | Jakobson et al. |

(56) References Cited

U.S. PATENT DOCUMENTS

| | | |
|---|---|---|
| 2012/0290407 A1 | 11/2012 | Hubbard et al. |
| 2013/0044130 A1 | 2/2013 | Geisner et al. |
| 2013/0104251 A1* | 4/2013 | Moore .................. G06F 21/602 |
| | | 726/30 |
| 2013/0212497 A1 | 8/2013 | Zelenko et al. |
| 2013/0239170 A1 | 9/2013 | Ziemann et al. |
| 2013/0247216 A1 | 9/2013 | Cinarkaya et al. |

OTHER PUBLICATIONS

U.S. Appl. No. 14/145,735, Final Office Action dated Nov. 13, 2015, 16 pages.
U.S. Appl. No. 14/145,735—Office Action dated Mar. 21, 2016, 22 pages.
U.S. Appl. No. 14/145,735—Final Office Action dated Sep. 13, 2016, 23 pages.
"The Force.com Multitenant Architecture", salesforce.com whitepaper, 2008, 16 pages.
U.S. Appl. No. 14/145,735—Respones to Office Action dated May 15, 2015 filed Aug. 17, 2015, 17 pages.
U.S. Appl. No. 14/145,735—Response to Final Office Action dated Nov. 13, 2015 filed Feb. 12, 2016, 11 pages.
U.S. Appl. No. 14/145,735—Response to Office Action dated Mar. 21, 2016 filed Jun. 17, 2016, 12 pages.
U.S. Appl. No. 14/145,735—Response to Final Office Action dated Sep. 13, 2016 filed Nov. 16, 2016, 10 pages.
U.S. Appl. No. 14/145,735—Notice of Allowance dated Dec. 5, 2016, 27 pages.

\* cited by examiner

Fig. 1 – Trust-Enhanced Social Environment

Fig. 2 – Trust Layer Schema

Fig. 3 – Trust Metadata Schema

Fig. 4 – Source Tree

Fig. 5 – Trust Object Model

Fig. 6 – Customer Interface

SYSTEM AND METHOD FOR ENHANCING TRUST FOR PERSON-RELATED DATA SOURCES

RELATED APPLICATION

This application claims the benefit of U.S. Provisional Patent Application No. 61/608,750, entitled, "A Social Key Legal And Compliance Layer," filed on 8 Mar. 2012. The provisional application is hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

The technology disclosed relates to enhancing trust for person-related data sources by tracking person-related sources using trust objects that hold trust metadata. In particular, it relates to generating trust-enhanced data by appending trust metadata to social media content and other business-to-business entities, and further using the trust-enhanced data to develop social engagement models based on customer preferences. The trust metadata described includes names, interface categories and origins of the person-related data sources along with customer engagement preferences and connection types.

The increasing prevalence of businesses using electronic media to communicate with customers has triggered enactment of several regulations governing electronic marketing. These regulations set rules for use of person-related data sources and customer engagement practices, which must be abided by marketers. With marketing regulations varying by regions and corporations, efficiently maintaining highly compliant data is a problem that yet remains to be solved.

Furthermore, suppliers of person-related data have the daunting challenge to conform to changing customer engagement preferences. Existing methodologies for constantly modifying contact lists based on customer norms are extremely cumbersome as they require designated personnel to make the modifications.

Accordingly, it is desirable to provide systems and methods that offer a flexible approach to automatic compliance with changing customer preferences and regulations governing electronic marketing.

An opportunity arises to provide customer engagement models based on customer sentiments that: filter contact lists at corporate and campaign levels; efficiently identify non-compliant data; and automatically remove or replace non-compliant data. Increased customer adoption, more effective customer interactions, and higher overall customer satisfaction and retention may result.

SUMMARY

The technology disclosed relates to enhancing trust for person-related data sources by tracking person-related sources using trust objects that hold trust metadata. In particular, it relates to generating trust-enhanced data by appending trust metadata to social media content and other business-to-business entities, and further using the trust-enhanced data to develop social engagement models based on customer preferences. The trust metadata described includes names, interface categories and origins of the person-related data sources along with customer engagement preferences and connection types.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The technology disclosed relates to enhancing the trust of person related data sources. In particular, it relates to tracking person-related data sources by associating data entities such as accounts, contacts, leads and social personas that hold person-related data with trust objects that track the sources.

The trust objects hold trust metadata, which includes names of person-related sources, interface categories of the person-related sources, origins of the person-related sources, a person's engagement preferences applicable to a particular data entity and the person's connection type with a primary data provider or a tenant that acquires the person-related data from the primary data provider. The primary data provider may be an owner of crowd-sourced data repositories or knowledge bases. The tenant may represent customers, customer departments, business or legal organizations, and/or any other entity that acquires person-related data for sales, marketing, campaigning or other customer engagement purposes.

In some implementations, upon receiving a request for person-related data from a tenant, the technology disclosed can look up rules set by the tenant for filtering person-related data based on the trust metadata described above. The technology disclosed can further apply the rules set by the tenant to the trust metadata and restrict transfer of any non-compliant data.

The technology disclosed can allow a tenant to obtain pre-processed trust-enhanced data that tracks person-related sources as per the process described above and further add additional person-related data to the data entities and populate the associated trust objects with additional trust metadata. The technology disclosed can look up tenant campaign rules applicable to filtering person-related data based on the trust metadata and conduct a campaign directed to persons verified as meeting the campaign rules. This results in preventing any campaign that uses person-related data which does not meet the campaign rules.

In some implementations, a tenant can be allowed to use enhanced trust annotations of person-related data sources. When a tenant receives a cease and desist from a named source of person-related data such as Facebook or Twitter, the technology disclosed can identify data entities that hold person-related data subject to the cease and desist by filtering person-related data supplied by the named source of person-related data based on the trust object. It can further identify data to be replaced as a consequence and automatically source the data back to the tenant from another source.

Using the technology disclosed, trust-enhanced social environments can be created that are adaptable to regulations requiring removal of person-related data sources. Upon a receiving a regulation that identifies a non-compliant source of person-related data, the technology disclosed can identify data entities that hold person-related data subject to the regulation by filtering person-related data supplied by the non-compliant source based on the trust object. It can then automatically remove the non-compliant source.

For instance, a government regulation may require a primary data provider like Salesforce.com to disable all business blogs originating from Australia. The technology disclosed can find all the data entities that hold person-related data supplied by Australian business blogs based on the source-interface category and source-origin fields of the trust metadata. Following this, it can suspend the associated trust object's connection to Australian business blogs by blocking a child node in the source tree described later in this application.

In another example, a corporate policy may restrict electronic marketing only to customers who have opted-in to receive e-mails. Using the trust metadata's engagement preference field, the technology disclosed can direct all further data flow only to data entities with opt-in status.

Changes in a customer's choice of data sources that supply person-related data to his or her social profile can be accommodated using the trust metadata. On receiving a customer request to remove some person-related data supplied by a named source of person-related data such as Chatter or Klout, the technology disclosed can identify the customer's data entities that hold the person-related data subject to the request by filtering person-related data supplied by the named source of the person-related data based on the trust object. It can then automatically unmap the customer's social profile from the named source.

Trust metadata can be referenced to a source tree that classifies person-related sources in a multi-level hierarchy. Within the source tree, the interface categories of the person-related sources can be arranged as parent nodes, and names of the person-related sources can be arranged as child nodes. Furthermore, the data entities can be mapped to interface categories and names in the source tree by referencing the trust objects to parent nodes and child nodes in the source tree using node ID fields in the trust metadata.

In one implementations, the data entities can be unmapped from an interface categories of sources or names of sources in the source tree by blocking a parent or child node using a suspend switch.

In another implementation, the data entities can be remapped to the interface categories of sources or names of sources in the source tree by unblocking a parent or child node using a resume switch.

Moreover, a customer interface can be provided that allows customers to monitor, analyze and modify the trust data using screen-based objects and widgets that are responsive to customer selection or de-selection.

In another example, a customer on a social networking site like Chatter or Klout may desire to restrict any feeds or updates coming from a particular social media source such as Facebook. Using the technology disclosed, the customer can access the above described customer interface and modify the "social trust metadata" through a delete widget described later in this application to stop referencing to Facebook APIs.

The technology disclosed relates to generating trust-enhanced data for use in a computer-implemented system. The described subject matter can be implemented in the context of any computer-implemented system, such as a software-based system, a database system, a multi-tenant environment, or the like. Moreover, the described subject matter can be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Trust-Enhanced Social Environment

Figure 1:
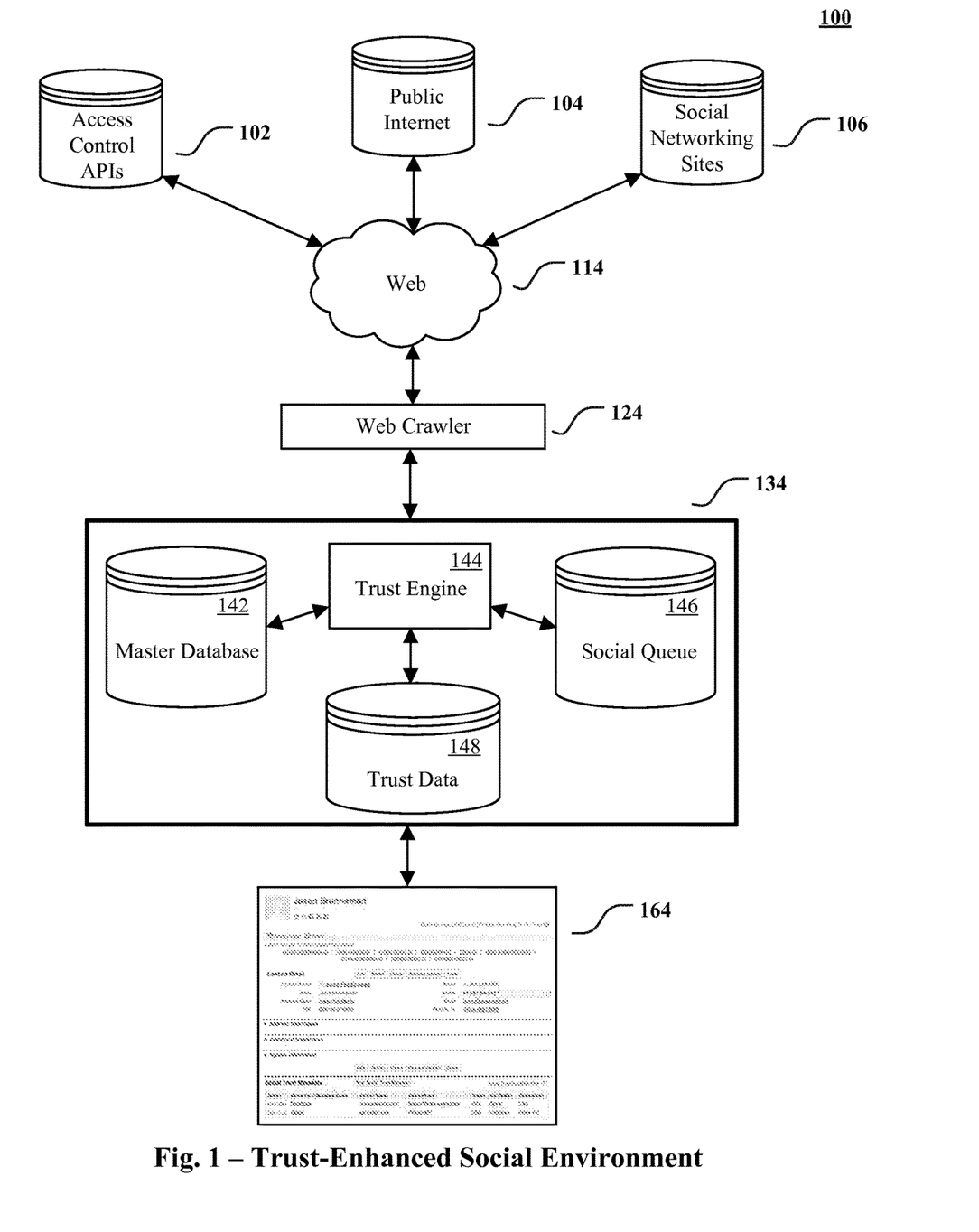
FIG. 1 shows a block diagram of one implementation of a social environment with a trust layer.

FIG. 1 shows a block diagram of one implementation of a social environment 100 with a trust layer 134. FIG. 1 also shows that social environment 100 can include different types of person-related data sources such as access controlled application-programming interfaces (APIs) 102, public internet 104 and social networking sites 106. The different types of public related data sources can be connected to web 114. FIG. 1 also shows that social environment 100 can include a web crawler 134 in communication with a trust layer 134. The trust layer 134 can further include a master database 142, trust data 148 and social queue 146 that are processed in trust engine 144. The trust layer 134 can be accessed via a customer interface 164. In other implementations, environment 100 may not have the same elements as those listed above and/or may have other/different elements instead of, or in addition to, those listed above.

Regarding different types of person-related data sources, access controlled APIs 102 like Yahoo Boss, Facebook Open Graph, Twitter Firehose can provide real-time search data aggregated from numerous social media sources such as Yahoo, Facebook and Twitter. Invocations to access controlled APIs 102 can initialize sorting, processing and normalization of person-related data. Public internet 104 can provide person-related data from public sources such as first hand websites, blogs, web search aggregators, and social media aggregators. Social networking sites 106 can provide person-related data from social media sources such as Twitter, Facebook, LinkedIn, and Klout.

Each type of person-related data source can be connected to web 114, which is crawled by a web crawler 124 that functions to search the person-related data sources and to retrieve person-related data, including social media content and web data associated with business-to-business contacts. In some implementations, the web crawler 124 can extract a list of contacts from the master database 142 and search those contacts on public-related data sources in order to determine if social or web content associated with contacts exists within those sources. If the sources provide positive matches to any of the contacts, the web crawler 124 can store the retrieved social or web content in a social queue 146 that provides the social and web data to trust engine 144.

Trust layer 134 can generate trust-enhanced data using trust engine 144. Trust engine 144 can append trust data 148 to business-to-business entities stored in master database 142 and to social and web content associated stored in social queue 146.

The customer interface 164 can provide an interface or dashboard for the customer to interact with the trust layer 134, including modifying the contents of trust data 148. The customer interface 164 can take one of a number of forms, including a dashboard interface, an engagement console, and other interfaces, such as a mobile interface or summary interface.

Trust Layer Schema

Figure 2:
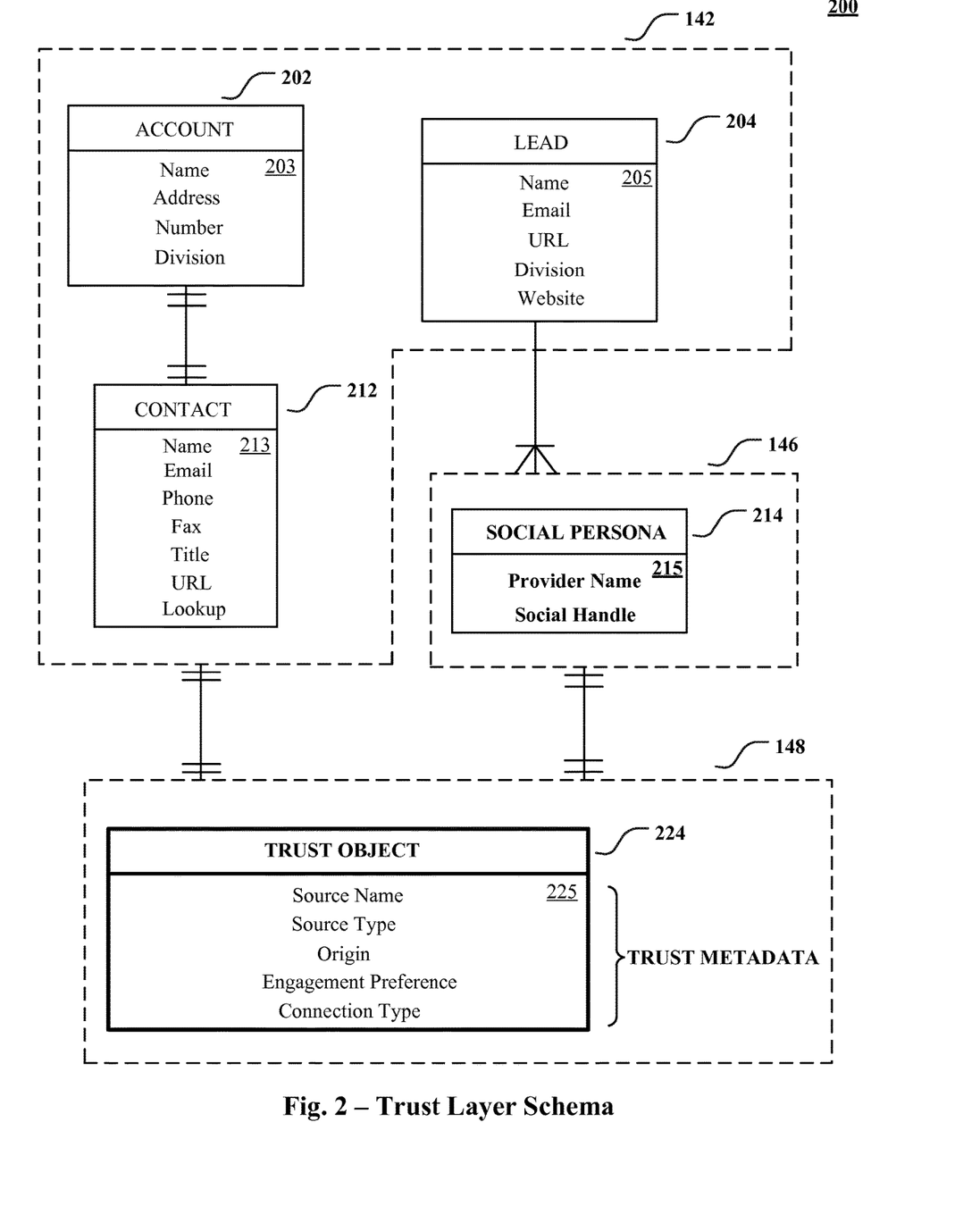
FIG. 2 illustrates one implementation of a schema for the trust layer shown in FIG. 1.

FIG. 2 illustrates one implementation of a schema 200 for the trust layer 134 shown in FIG. 1. FIG. 2 shows that schema 200 can include business-to-business entities 202, 212 and 204 stored in the master database 142 and social persona 214 of entity 204 stored in the social queue 146. FIG. 2 also shows that schema 200 can include a trust object 224, which is associated with the business-to-business entities 202, 212 and 204 and social persona 214. In other implementations, schema 200 may not have the same tables or fields as those listed above and/or may have other/different tables or fields instead of, or in addition to, those listed above.

Business-to-business entities include standard entities such as account 202, contact 212 and lead 204, each containing pre-defined fields 203, 205 and 213. In the account entity 202 example, such pre-defined fields can include a name column, an address column, a number of employees column and others as would be useful for storing account-related information. Similarly, standard entities contact 212 and lead 204 can store contact-related and lead-related information respectively.

Social persona entities can add social context to business-to-business entities. Conversely, business-to-business entities can add business context to social persona entities. For purposes of simplicity and clarity, FIG. 2 shows only one social persona entity linked to a business-to-business entity. In other implementations, business-to-business entities can have one or more social persona entities and vice-versa.

FIG. 2 shows a social persona entity 214 that can provide social media content 215 such as name of the social media source, social handle and social profile for lead 204. For instance, a social handle of a person-related data source like Twitter can identify the username a person has selected and the accompanying uniform resource locator (URL) like http://twitter.com/username.

Trust object 224 can be associated with business-to-business entities stored in the master database 142 and/or with social persona entities stored in the social queue 146. Trust object 224 can hold the trust metadata 225 that includes fields describing names, interface categories and origins of the person-related data sources together with a person's engagement preferences and connection type with a third party.

Trust Metadata Schema

Figure 3:
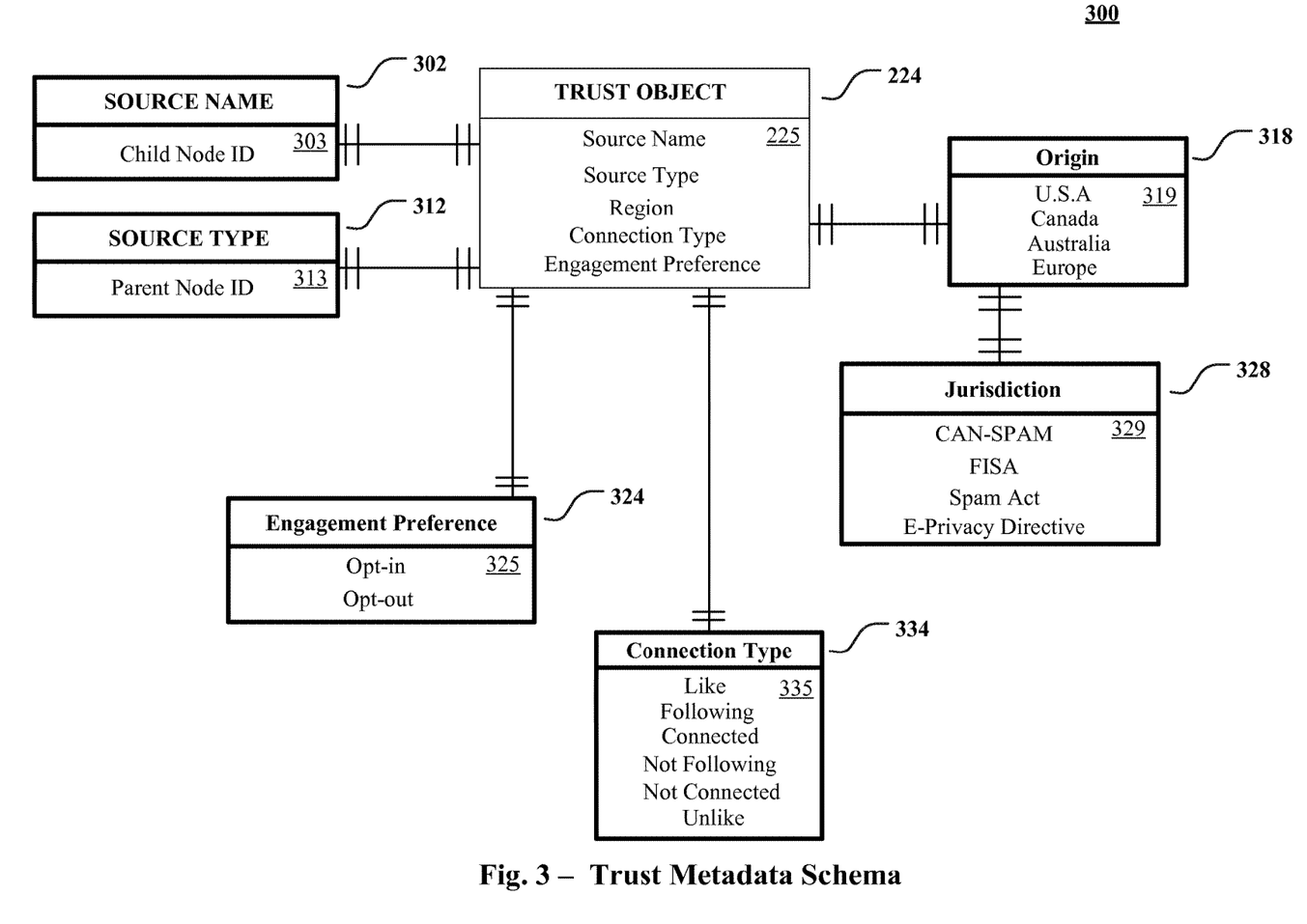
FIG. 3 illustrates one implementation of a schema for the trust metadata shown in FIG. 2.

FIG. 3 illustrates one implementation of a schema 300 for the trust metadata 225 shown in FIG. 2. FIG. 3 shows that schema 300 can include a source-name table 302, source-type table 312, source-origin table 318 associated with a source jurisdiction table 328, engagement preference table 324, and connection type table 334. In other implementations, schema 300 may not have the same tables or fields as those listed above and/or may have other/different tables or fields instead of, or in addition to, those listed above.

Figure 4:
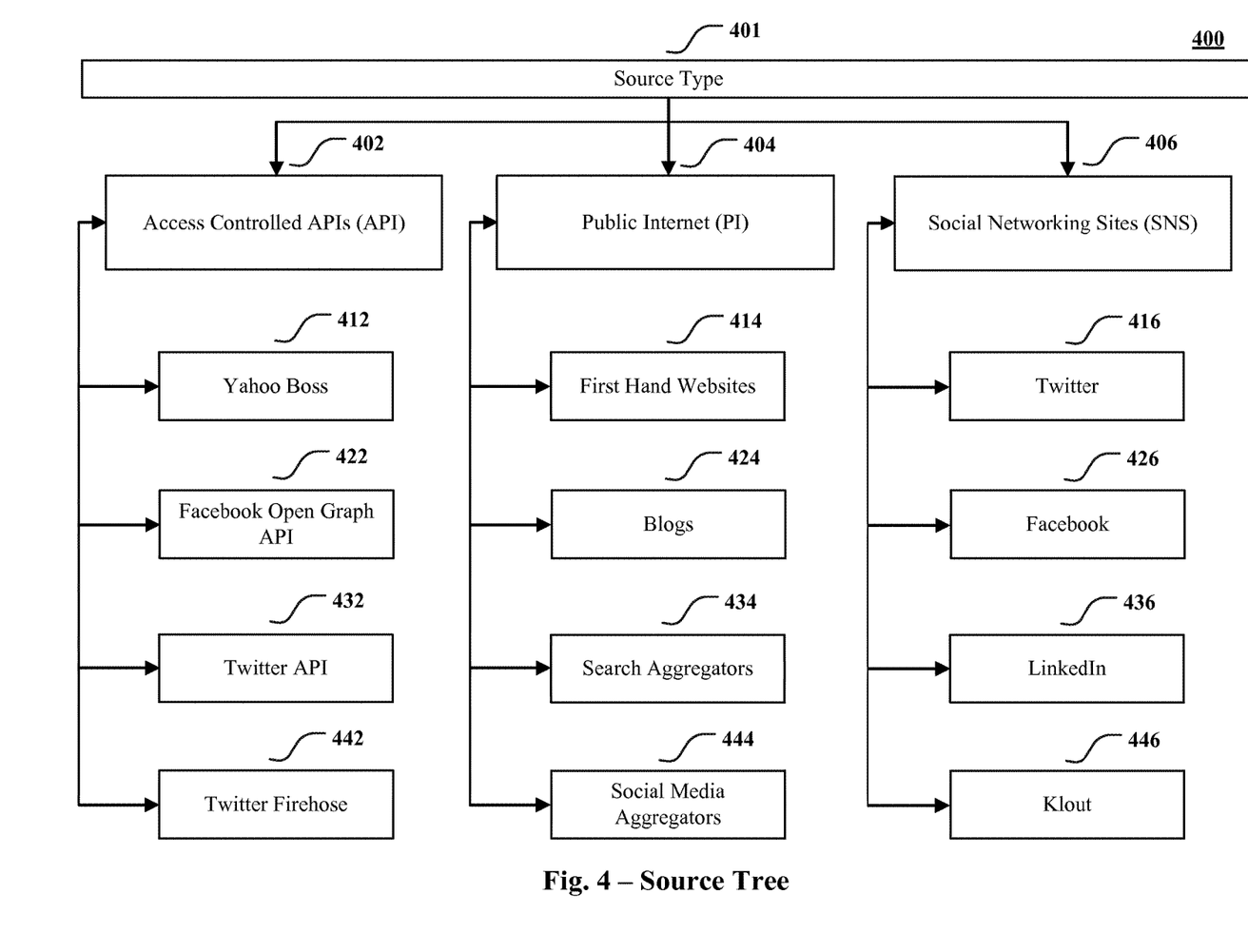
FIG. 4 shows a block diagram of one implementation of a source tree.

Source-name table 302 can include a child node ID 303 referencing to a name of a person-related data source like Yahoo Boss 412, Search Aggregators 434 or LinkedIn 436 in a source tree 400 described later in this application. Source-type table 303 can include a parent node ID 303 referencing to a type of a person-related data source such as access controlled application-programming interfaces (APIs) 402, public internet 404 and social networking sites 406 in the source tree 400 described later in this application.

Source-origin table 318 can specify the geographic location of a person-related data source in terms of region or other geographical classification such as countries 319 like U.S.A., Canada, Australia and Europe. Source-origin table 318 can be associated to a jurisdiction table 328 to identify the jurisdiction applicable to the particular geographic location. For example, the field named "U.S.A" in source-origin table 318 can reference to field named "CAN-SPAM" in the jurisdiction table 328, thus assigning CAN-SPAM regulation to person-related data sources originating from the country U.S.A.

Engagement preference table 324 includes the "opt status 325" of a person, thus specifying whether a person has opted-in or opted-out from engaging with a third-party.

Connection type table 334 includes the type of connection a person with a third party, including pre-defined fields 335 such as like, following, connected, not following, not connected, unlike etc.

Source Tree

FIG. 4 shows a block diagram of one implementation of a source tree 400. FIG. 4 shows that source tree 400 can include different types of person-related data sources such as access controlled application-programming interfaces (APIs) 402, public internet 404 and social networking sites 406 arranged as parent nodes. FIG. 4 shows that source tree 400 can include names of different person-related sources such as Yahoo Boss 412, first hand websites 414, Twitter 416, Facebook Open Graph API 422, blogs 424, Facebook, 426, Twitter API 432, search aggregators 434, LinkedIn 436, Twitter Firehose 442, social media aggregators 444, and Klout 446 arranged as child nodes. In other implementations, source tree 400 may not have the same sources or types of sources as those listed above and/or may have other/different sources or types of sources instead of, or in addition to, those listed above.

Trust Object Model

Figure 5:
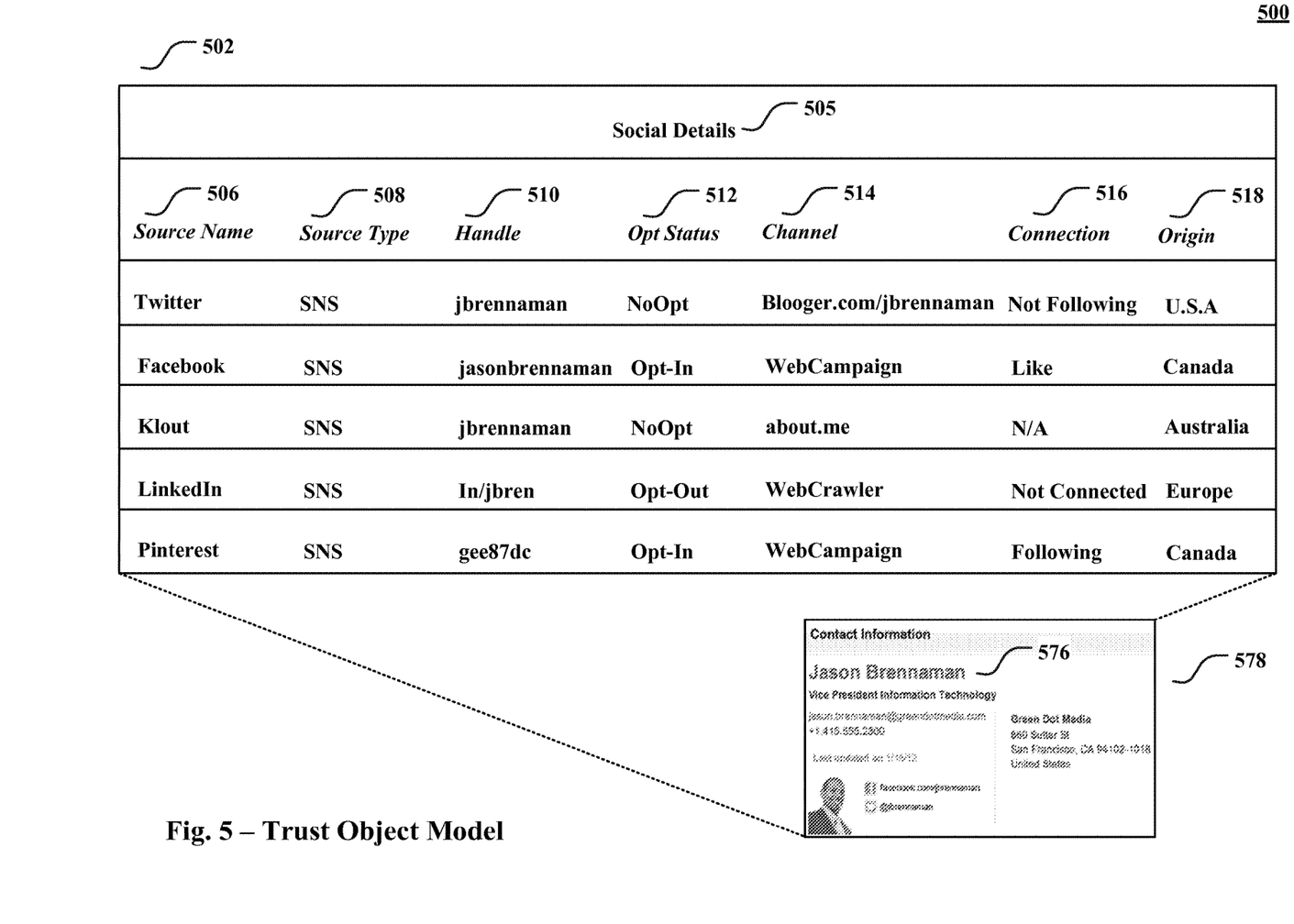
FIG. 5 illustrates one implementation of a model for the trust object shown in FIG. 2.

FIG. 5 illustrates one implementation of a model 500 for the trust object 224 shown in FIG. 2. FIG. 5 shows that trust object model 500 can hold trust metadata 502 in the form of social details 505 of a person named "Jason Brennaman 576." Social details 505 can specify various social personas and their source-related information, engagement preferences and third-party connection type for Jason Brennaman 576. In other implementations, trust object model 500 may not have the same social details as those listed above and/or may have other/different social details instead of, or in addition to, those listed above.

Social details can include a field source name 506 that identifies the names of person-related data sources like Twitter, Facebook etc., for various social handles 510 such as "jbrennaman", "gee87dc." Source type 508 provides the source-type or interface category associated with a source name as per source tree 400. Opt status 512 specifies whether Jason Brennaman 576 has opted-out or opted-in from engaging with a particular source. Channel 514 gives the names of channels like "WebCampaign", "about.me", etc. from which a social handle was acquired or crawled by the web crawler 124. Connection 516 shows the type of connection Jason Brennaman 576 with a third-party acquiring the person-related data. Origin 518 specifies the geographic regions such as Europe, Australia, etc. of person-related data sources. In some implementations, trust object model 500 can be consolidated into a customer-friendly interface 578 by referencing various fields of the trust object model 500 to text fields in the customer-friendly interface 578.

Customer Interface

Figure 6:
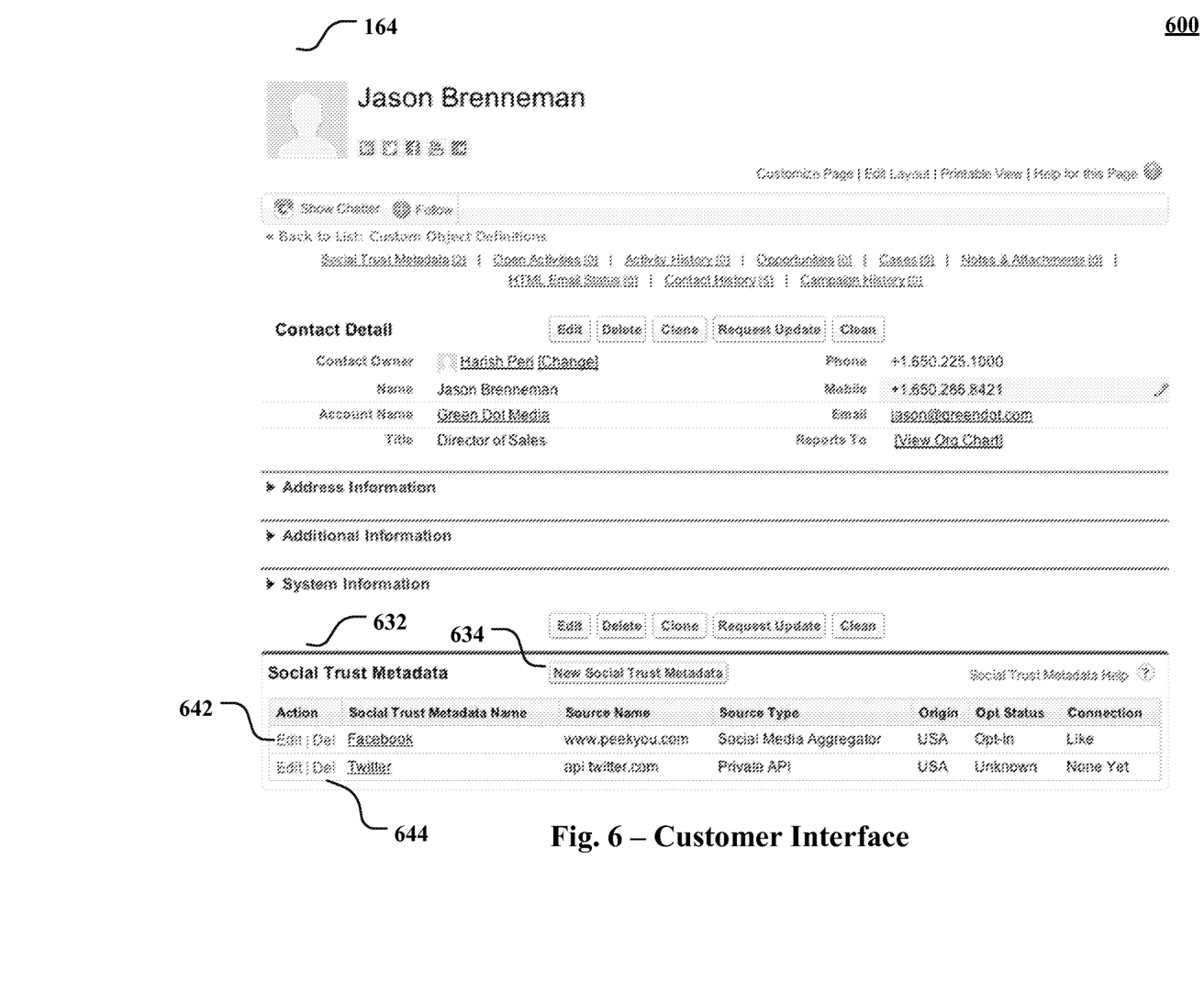
FIG. 6 shows one implementation of a customer interface for creating a trust object.

FIG. 6 shows one implementation 600 of a customer interface 164 for creating the trust metadata 225. FIG. 5 shows that the customer interface 164 can include a In other implementations, customer interface 600 may not have the same widgets or as those listed above and/or may have other/different widgets instead of, or in addition to, those listed above.

The customer interface 164 provides an interface or dashboard for the customer to interact with the trust layer 134, including creating and modifying the trust object 224 and constituting trust metadata 225.

In some implementations, the customer interface 164 as a dashboard interface can be a hosted software service accessible via an Internet web browser and function as a primary interface used by the customer to monitor, analyze, and engage trust metadata 225. The dashboard interface can allow the customer to interact with data using screen-based objects referred to as the social trust metadata 632. Trust metadata 632 can include a new trust metadata widget 634 that an create new trust metadata, an edit widget 642 that can edit the fields of the trust object 225 and a delete widget 644, which deletes fields from the trust metadata 225.

In another implementation, the customer interface 164 as an engagement console can be a computer desktop application primarily used for team-based workflow of social media content engagement. The engagement console can present trust metadata widget 632 into configurable "stacks" such that customer can create new trust metadata or modify existing trust metadata 225 through individual posts. These stacks can also support various filters and execution of workflow macros allowing customers to assign rules and triggers to the flow of trust metadata 225.

Some Particular Implementations

The technology disclosed may be practiced as a method or system adapted to practice the method.

In one implementation, a method is described for method for enhancing trust for person-related data sources. The method includes tracking person-related data sources by associating data entities that hold the person-related data with trust objects that track the sources, wherein the trust objects hold trust metadata, including names of person-related sources, interface categories of the person-related sources, origins of the person-related sources, and a person's engagement preferences applicable to a particular data entity.

The method further includes receiving a tenant request for person-related data, looking up rules set by the tenant for filtering person-related data supplied in response to the request based on the names of the person-related sources, the interface categories of the person-related sources, origin of the person-related sources, and/or the engagement preferences applicable to the particular data entity and applying the rules set by the tenant to the trust metadata to restrict transfer of any person-related data that does not meet the rules set by the tenant.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The method describes the interface categories of person-related data sources to include access controlled APIs, public internet and social networking sites. It further describes the data entities to represent accounts, contacts or leads or social personas of accounts, contacts or leads.

The method further describes the origins of the person-related sources to identify geographic locations of the sources. It further describes the engagement preferences applicable to the particular data entity to specify whether the person associated with the data entity has opted-in or opted-out of engaging with the tenant.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method is described for enhancing trust for person-related data sources. The method includes obtaining trust-enhanced person-related data that tracks person-related data sources by associating data entities that hold the person-related data with trust objects that track the sources, wherein the trust objects hold trust metadata, including names of the person-related sources, interface categories of the person-related sources, origins of the person-related sources, a person's engagement preferences applicable to a particular data entity, and a connection type between the person and a tenant.

The method further includes adding additional person-related data to the data entities and populating the associated trust objects with additional trust metadata for the additional person-related data. It further includes populating the connection type data fields of the trust objects that identify one or more connection types between the person and the tenant.

The method further includes looking up tenant campaign rules applicable to filtering person-related data used in campaigns based on the names of the person-related sources, the interface categories of the person-related sources, the origins of the person-related sources, the engagement preferences applicable to the particular data entity, and the connection type between the person and the tenant. It further includes conducting a campaign directed to persons verified as meeting the campaign rules by applying the campaign rules to the trust metadata to restrict use in any campaign of person-related data that does not meet the campaign rules.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, a method of using enhanced trust annotations of person-related data sources is described. The method includes tracking person-related data sources by associating data entities that hold the person-related data with trust objects that track the sources, wherein the trust objects hold trust metadata, including names of person-related sources, interface categories of the person-related sources, origins of the person-related sources, and a person's engagement preferences applicable to a particular data entity The method further includes receiving a cease and desist from a named source of person-related data. It further includes identifying data entities that hold person-related data subject to the cease and desist by filtering person-related data supplied by the named source of the person-related data, based on the trust object.

The method further includes identifying data to be replaced as a consequence and automatically sourcing the data from another source.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, a method is described for complying to a regulation governing use of person-related data sources. The method includes tracking person-related data sources by associating data entities that hold the person-related data with trust objects that track the sources, wherein the trust objects hold trust metadata, including names of person-related sources, interface categories of the person-related sources, origins of the person-related sources, and a person's engagement preferences applicable to a particular data entity.

The method further includes receiving a government regulation that identifies a non-compliant source of person-related data. It further includes identifying data entities that hold person-related data subject to the regulation by filtering person-related data supplied by the non-compliant source of person-related data, based on the trust object and automatically removing the non-compliant source.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, a method is described for complying to a change in customer preferences around person-related data sources. The method includes tracking person-related data sources by associating data entities that hold the person-related data with trust objects that track the sources, wherein the trust objects hold trust metadata, including names of person-related sources, interface categories of the person-related sources, origins of the person-related sources, and a person's engagement preferences applicable to a particular data entity.

It further includes receiving a customer request to remove from customer's data entities some person-related data supplied by a named source of person-related data. It further includes identifying the customer's data entities that hold the person-related data subject to the request by filtering person-related data supplied by the named source of the person-related data, based on the trust object and automatically unmapping the customer's data entities from the source.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The method includes creating a source tree that classifies person-related sources in a multi-level hierarchy, wherein the interface categories of the person-related sources are arranged as parent nodes and names of the person-related sources are arranged as child nodes. It further includes mapping data entities to interface categories and names in the source tree by referencing the trust objects to parent nodes and child nodes in the source tree using node ID fields in the trust metadata.

The method further includes unmapping the data entities from the interface categories of sources or names of sources in the source tree by blocking a parent or child node using a suspend switch.

The method further includes remapping the data entities to the interface categories of sources or names of sources in the source tree by unblocking a parent or child node using a resume switch.

The method further includes allowing the customer to create or modify the trust object using a customer interface that provides access to the trust metadata.

What is claimed is:

1. A method for filtering transmissions of person-related data, the method comprising:
   executing, by a processor, a web crawler configured to retrieve continually, from a plurality of data sources, the person-related data, the person-related data being for a person and including, for each of the plurality of data sources, a username used by the person;
   appending, by the processor, metadata to the person-related data, the metadata including, for each of the plurality of data sources, a name of a data source of the plurality of data sources and an interface category of the data source;
   storing, by the processor and in a multi-tenant database, the person-related data and the metadata;
   receiving, by the processor and from a first electronic device associated with a first tenant in a multi-tenant environment, a first set of rules for filtering a request for the person-related data, the first set of rules being based upon the metadata, the first set of rules including a restriction with respect to transmitting a first item of the person-related data;
   receiving, by the processor and from a first electronic device associated with a second tenant in the multi-tenant environment, a second set of rules for filtering a request for the person-related data, the second set of rules being based upon the metadata, the second set of rules including a restriction with respect to transmitting a second item of the person-related data, the second set of rules being different from the first set of rules;

receiving, by the processor and from a second electronic device associated with the first tenant, a first request for the person-related data;

transmitting, from the processor, to the second electronic device associated with the first tenant, and in accordance with the first set of rules, a first portion of the person-related data, the first portion including at least a first username used by the person;

receiving, by the processor, from a second electronic device associated with the second tenant, and at a first time, a second request for the person-related data;

transmitting, from the processor, to the second electronic device associated with the second tenant, and in accordance with the second set of rules, a second portion of the person-related data, the second portion including at least a second username used by the person;

receiving, by the processor, from a third electronic device associated with the second tenant, and at a second time, a third request for the person-related data, the second time being after the first time; and transmitting, from the processor, to the third electronic device associated with the second tenant, and in accordance with the second set of rules, a third portion of the person-related data, the third portion including at least a third username used by the person, the third username being different from the second username, the third username having been stored in the multi-tenant database after the first time.

* * * * *